United States Patent
Jones et al.

(10) Patent No.: US 7,873,810 B2
(45) Date of Patent: Jan. 18, 2011

(54) MICROPROCESSOR INSTRUCTION USING ADDRESS INDEX VALUES TO ENABLE ACCESS OF A VIRTUAL BUFFER IN CIRCULAR FASHION

(75) Inventors: Darren M. Jones, Los Altos, CA (US); Ryan C. Kinter, Los Altos, CA (US); Radhika Thekkath, Palo Alto, CA (US); Chinh Nguyen Tran, Palo Alto, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 237 days.

(21) Appl. No.: 10/956,498

(22) Filed: Oct. 1, 2004

(65) Prior Publication Data

US 2006/0075208 A1 Apr. 6, 2006

(51) Int. Cl.
*G06F 12/00* (2006.01)
*G06F 9/26* (2006.01)
*G06F 9/34* (2006.01)
*G06F 15/00* (2006.01)
*G06F 7/38* (2006.01)
*G06F 9/00* (2006.01)
*G06F 9/44* (2006.01)

(52) U.S. Cl. ........................ 711/220; 712/255
(58) Field of Classification Search .................. 711/217
See application file for complete search history.

(56) References Cited

U.S. PATENT DOCUMENTS 5,357,620 A 10/1994 Suzuki 5,535,412 A * 7/1996 Nadehara .................... 711/110

(Continued)

FOREIGN PATENT DOCUMENTS

EP 0992880 4/2000

(Continued)

OTHER PUBLICATIONS

Gavin, Overview of the 80×86 Family, retrieved by examiner on Nov. 12, 2008 as archived on Jun. 5, 2001 from http://web.archive.org/web/20010605214823/http://www.redbrick.dcu.ie/~creech/assembly/asm2.html, 3 pages.*

(Continued)

*Primary Examiner*—Kevin L Ellis
*Assistant Examiner*—Gary W Cygiel
(74) *Attorney, Agent, or Firm*—Sterne, Kessler, Goldstein & Fox P.L.L.C.

(57) ABSTRACT

A modular subtraction instruction for execution on a microprocessor having at least one register. The instruction includes opcode bits for designating the instruction and operand bits for designating at least one register storing an offset index, a decrement value, and an address index. When the modular subtraction instruction is executed on the microprocessor, the address index is modified by the decrement value if the address index is not zero and is modified by the offset index if the address index is zero. For example, the address index is repeatedly decremented using the decrement value until it reaches zero, and then the address index is reset back to the offset index. The operand bits may include multiple fields identifying multiple registers selected from the general purpose registers of the microprocessor. The modular subtraction instruction enables access to a buffer in memory in circular fashion by virtue of its operation.

25 Claims, 10 Drawing Sheets

U.S. PATENT DOCUMENTS

| | | | |
|---|---|---|---|
| 5,623,621 A * | 4/1997 | Garde | 711/220 |
| 6,760,837 B1 | 7/2004 | Laurenti et al. | |
| 6,782,447 B2 * | 8/2004 | Ostler et al. | 711/110 |
| 7,401,205 B1 | 7/2008 | Dally et al. | |
| 2002/0053015 A1 | 5/2002 | Tan et al. | |
| 2002/0116602 A1 | 8/2002 | Kissell et al. | |
| 2003/0120904 A1 | 6/2003 | Sudharsanan et al. | |
| 2005/0108312 A1 | 5/2005 | Chen et al. | |
| 2005/0166036 A1 | 7/2005 | Catherwood et al. | |

FOREIGN PATENT DOCUMENTS

| | | |
|---|---|---|
| EP | 1039370 | 9/2000 |
| WO | WO 0144921 | 6/2001 |

OTHER PUBLICATIONS

Lexra, LX5280 Data Sheet, Apr. 2001, Lexra, 41 pages.*

James Ross Goodman: "Energy Scalable Reconfigurable Cryptographic Hardware for Portable Applications." pp. 141, 142 & 147, Aug. 2000.

Lexra LX5280 Data Sheet; Lexra, Inc., Release 1.9; Apr. 30, 2001. Introduction, Chapters 2 and 5.

Lextr LX5380 Delta Data Sheet; Lexra, Inc., Revision 1.1. (Draft), Nov. 16, 2001; Appendix A, p. A.1, A.2, and A.5.

International Search Report and Written Opinion, dated Feb. 13, 2006, for PCT Appl. No. PCT/US2005/028773, 11 pages.

Examination Report, dated Feb. 1, 2008, for European Patent Appl. No. 05789271.3, 4 pages.

Furber, S.B., *VLSI RISC Architecture and Organization*, 1989, Marcel Dekker, NY, US, pp. 110-115.

"Orthogonal Data Flow for High-Concurrency in a Digital Signal Processor," *IBM Technical Disclosure Bulletin*, vol. 38, No. 4, Apr. 1995, pp. 383-387, Armonk, New York, US, XP000516188.

*TMS320C3x User's Guide*, Texas Instruments, Literature No. SPRU031E, 2558539-9761 revision L, Jul. 1997, cover page and pp. 1-2 thru 1-4, 2-9, 2-10, and 6-21 thru 6-25.

* cited by examiner

```
void
mips_block_fir_filter16(
        int16_t *output,
        const int16_t *input,
        size_t num_samples,
        const int16_t *coeffs,
        int16_t *delay_line,
        size_t num_taps,
        int scale,
        unsigned int flag
)
{
        size_t i;
        int16_t *pdelay;
        const int16_t *pcoeff;
        int64_t acc;
        size_t k;
        int16_t a;
        int32_t z;

scale += 15;
        for ( i = num_samples; i; --i ) {
                pdelay = delay_line;
                pcoeff = coeffs;
                acc = 0;
                for ( k = num_taps - 1; k; --k ) {
                        a = pdelay[ 1 ];
                        *pdelay++ = a;
                        acc += (int32_t) a * *pcoeff++;
                }
                a = *input++;
                *pdelay = a;
        acc += (int32_t) a * *pcoeff;
        z = acc>>scale;
        *output++ = SAT16( z );
        }
}
```

Copyright © 2004. MIPS Technologies, Inc. All rights reserved.

FIG. 7

```
void
mips_block_fir_filter16(
        int16_t *output,
        const int16_t *input,
        size_t num_samples,
        const int16_t *coeffs,
        int16_t *delay_line,
        size_t num_taps,
        int scale,
        unsigned int flag
)
{
        size_t i;
        int16_t *pdelay;
        const int16_t *pcoeff;
        a64 acc;
        size_t k;
        int32_t rt;
        unsigned int ndx_x = 0;
        int32_t temp_pdelay;
        int h, x;

rt = ( ((num_taps-1)*2) << 8 ) || 2; //index of last element = # of taps-1, decrement = 2
        pdelay = delay_line;
        for (i = num_samples; i; --i) {
                pdelay[ndx_x] = *input++;
                ndx_x = __builtin_mips_modsub (ndx_x, rt);
                pcoeff = coeffs;
                acc = 0;
                for (k=num_taps-1; k; k--) {
                        //acc += *pcoeff++ * pdelay[ndx_x];
                        temp_pdelay = __builtin_mips_lhx ((void *) pdelay, ndx_x);
                        acc = __builtin_mips_dpaq_l_w (acc, *pcoeff, temp_pdelay);
                        pcoeff++;
                        ndx_x = __builtin_mips_modsub (ndx_x, rt);
                }
                *output++ = (int16_t) __builtin_mips_extrv_rs_w (acc, scale+16);
        }
}
```

Copyright © 2004. MIPS Technologies, Inc. All rights reserved.

FIG. 8

```
/*
mips_block_fir_filter16 function
*/
        .text
        .globl mips_block_fir_filter16
        .ent mips_block_fir_filter16
        .set noreorder mips_block_fir_filter16:

.frame $sp, 0, $ra

#$a0 = output pointer
        #$a1 = input pointer
        #$a2 = number of samples
        #$a3 = coefficient pointer
        #$t0 = a (16bit)
        #$t1 = pdelay
        #$t2 = pcoeff
        #$t7 = innerloop counter
        #$v0 = scale (0-16)

lw $t1, 16($sp)
        lw $t7, 20($sp)
        lw $v0, 24($sp)

andi $a2, 0xFFFC #ensure num_samples is a multiple of 4
        beqz $a2, cleanup #ensure num_samples is positive andi $t7, $t7, 0xFFFC
        addiu $t7, -1 #t7 is innerloop counter (multiple of 4)-1 addiu $v0, 15 #v0 is lo bit shift
        li $t0, 32
        subu $v1, $t0, $v0 #v1 is hi bit shift addiu $t8, $zero, 0x8000
        addiu $t9, $zero, 0x7FFF sll $a2, 1
        addu $a2, $a0 #outerloop counting on pointer sll $t5, $t7, 1
        addu $t5, $t1 #innerloop counting on delay pointer mult $zero, $zero #zero out hilo
        move $t2, $a3 #init pcoeff pointer
        lw $t1, 16($sp) #init pdelay pointer
```

Copyright © 2004. MIPS Technologies, Inc. All rights reserved.

FIG. 9A

```
outerLoop:

innerLoop3x:

lh $t0, 2($t1) #load the next delay
        lh $t4, 0($t2) #load the coefficient
        sh $t0, 0($t1) #shift it back one
        madd $t0, $t4 #accumulate lh $t0, 4($t1) #load the next delay
        lh $t4, 6($t1) #load the next delay
        lh $t3, 2($t2) #load the coefficient
        lh $t6, 4($t2) #load the coefficient sh $t0, 2($t1) #shift it back one
        sh $t4, 4($t1) #shift it back one
        madd $t0, $t3 #accumulate
        madd $t4, $t6 #accumulate addiu $t1, 6 #increment delay pointer
        addiu $t2, 6 #increment coeff ptr in branch delay innerLoop4x:
        beq $t5, $t1, innerLoopEnd innerLoop:

lh $t0, 2($t1) #load the next delay
        lh $t4, 4($t1) #load the next delay
        lh $t3, 0($t2) #load the coefficient
        lh $t6, 2($t2) #load the coefficient sh $t0, 0($t1) #shift it back one
        sh $t4, 2($t1) #shift it back one
        madd $t0, $t3 #accumulate
        madd $t4, $t6 #accumulate lh $t0, 6($t1) #load the next delay
        lh $t4, 8($t1) #load the next delay
        lh $t3, 4($t2) #load the coefficient
        lh $t6, 6($t2) #load the coefficient sh $t0, 4($t1) #shift it back one
        sh $t4, 6($t1) #shift it back one
        madd $t0, $t3 #accumulate
        madd $t4, $t6 #accumulate addiu $t1, 8 #increment delay pointer
        bne $t5, $t1, innerLoop
        addiu $t2, 8 #increment coeff ptr in branch delay
```

Copyright © 2004. MIPS Technologies, Inc. All rights reserved.

*FIG. 9B*

```
innerLoopEnd:

lh $t0, 0($a1) #a = *input
    lh $t3, 0($t2) #load the coeff addiu $a1, 2 #increment the input pointer madd $t0, $t3 #accumulate
    mflo $t4 addiu $a0, 2 #increment the output pointer
    mfhi $t3 sh $t0, 0($t1) #*pdelay = a;
    mult $zero, $zero #zero out hilo
    move $t2, $a3 #init pcoeff pointer
    lw $t1, 16($sp) #init pdelay pointer

Scale srlv $t4, $t4, $v0 #shift low bits right
    sll $t3, $v1 #shift hi bits left
    addu $t4, $t3 #merge

SAT16 slt $t3, $t4, $t8
    movn $t4, $t8, $t3
    slt $t3, $t9, $t4
    movn $t4, $t9, $t3 bne $a2, $a0, outerLoop
    sh $t4, -2($a0) #Assign output outerLoopEnd:

cleanup:

jr $ra
    nop
    .end mips_block_fir_filter16
    .set reorder

Copyright © 2004. MIPS Technologies, Inc. All rights reserved.
```

FIG. 9C

MICROPROCESSOR INSTRUCTION USING ADDRESS INDEX VALUES TO ENABLE ACCESS OF A VIRTUAL BUFFER IN CIRCULAR FASHION

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates in general to microprocessor architecture, and more particularly to a single microprocessor instruction that enables access to a virtual buffer in a memory associated with the microprocessor in circular fashion using address index values and one or more general purpose registers.

BACKGROUND OF THE INVENTION

Circular buffers are commonly used in many Digital Signal Processing (DSP) filters and other similar algorithms and applications. The most common DSP operation is the implementation of a filter function which achieves in the digital domain what an analog filter would achieve in the analog domain. Since digital values are discrete, the filter operation attempts to emulate the operation of the analog filter using a method in which a number "n" of input values are used at each computation step. Although discontinuity in signal values does not occur in the analog domain, such discontinuity can occur in discrete digital computations. In an attempt to mitigate the negative effects of the discontinuity in signal values, each filter summation uses one new sample value and n−1 old sample values. This type of filter operation is best done using a circular buffer which simply adds the new value to the current position in the buffer and reuses all the old values without re-copying them to a new buffer. And this type of filter computation is so common that substantially all digital signal processors provide support for hardware circular buffers. Otherwise, the overhead of copying n−1 values for each outer loop of the filter summation would almost always be necessary, which would significantly reduce efficiency and performance.

Conventional DSP and DSP-like microprocessors provided support for circular buffers. Such conventional implementations, however, often had many limitations and deficiencies and were often difficult to implement and/or use. For example, multiple and/or new states were often required. The number of buffers that could be simultaneously defined and used was often constrained by the total number of special purpose register sets that were implemented to hold the register values and variables. In typical conventional microprocessor applications, each circular buffer was implemented using multiple registers that held the location of the buffer base address and buffer limit. Each set of buffer registers typically comprised special purpose registers, rather than general purpose registers, where each set was often dedicated to a single buffer. Thus, multiple sets were required to support multiple circular buffers implemented at the same time resulting in an artificial limit of simultaneous buffers. If more buffers had to be used simultaneously than the total number of available buffer register sets, then one or more buffer states had to be stored and retrieved, significantly reducing efficiency. Furthermore, in many conventional configurations, circular buffers were implemented using circular or modular address arithmetic to recalculate the next address in the circular buffer. Such arithmetic solutions typically required storage of the buffer size, complicated the implementation source code, and resulted in less efficient code that consumed valuable processor cycles during run-time.

In many of the conventional configurations including the arithmetic solutions described above, the buffer size was often limited to a power of two so that the buffer size could be represented as an exponent. The "exponent of two" buffer size representation often resulted in significant waste of memory resources. For example, if a buffer size of 10 kilobytes (KB) was required, the buffer size had to be 16 KB since the next smaller buffer size of 8 KB was not adequate. Furthermore, conventional configurations including the arithmetic solutions required stricter limits on the location of the buffer, such as alignment with the data size of the memory.

It is desired to enable implementation of circular buffers in program memory of a microprocessor system that allows maximum flexibility with minimal constraints. It is further desired to maximize compiled code efficiency and performance.

SUMMARY

A processor according to an embodiment of the present invention is configured to enable access of a virtual buffer in circular fashion using at least one register and logic which manipulates indexes to enable addressing of the elements in the buffer. The processor includes at least one register which stores an address index, a last element offset and a decrement and logic which executes a circular buffer instruction. During execution of the instruction, the logic compares the address index to zero, modifies the address index to the last element offset if the address index is zero, and modifies the address index by the decrement if the address index is not zero. In various aspects, the logic replaces the address index with the last element offset, or otherwise adds the last element offset to the address index, when the address index is zero, or subtracts the decrement from the address index if the address index is not zero.

A base address points to a first or base element of the circular buffer located in memory. The address index, when added to the base address, provides a pointer to specific elements in the circular buffer. The last element offset is also an index, such that when added to the base address, provides a pointer to the last element at the "top" of the circular buffer. The decrement corresponds with the size of each element, so that modifying the address index by the decrement enables addressing of the sequential elements of the buffer. The use of relative indexes eliminates complicated arithmetic computations. Rather than performing circular or modular address arithmetic operations to calculate buffer element addresses, the address index is simply compared to zero. When the address index reaches zero, it is modified with or otherwise replaced by the last element offset to wrap or roll around to the top element of the circular buffer.

The address index, last element offset and decrement may be stored in a single register or multiple registers, such as the general purpose registers (GPRs) of the processor. In one aspect, a first GPR stores the address and at least one other GPR stores the last element offset and the decrement. In one multiple register case, the logic, while executing the circular buffer instruction, retrieves the address index and the decrement from at least one second GPR, determines whether the first GPR is zero, loads the first GPR with the last element offset if the first GPR is zero, and subtracts the decrement from the first GPR if the first GPR is not zero. In another aspect including first, second and third GPRs, the logic determines whether the first GPR is zero, loads a third GPR with the last element offset if the first GPR is zero, and subtracts the decrement from the third GPR if the first GPR is not zero.

In yet another aspect, the instruction itself identifies the one or more registers used in the instruction. In one specific embodiment, the last element offset and decrement are stored in a first register and the address index is stored in a second register. In another embodiment, the circular buffer instruction identifies a first register storing the address index, a second register storing the last element offset and the decrement, and a third register providing a destination for a result of modifying the address index.

A microprocessor system according to an embodiment of the present invention includes a microprocessor and a memory. The microprocessor includes at least one register and an execution unit that executes program instructions. The memory stores a buffer and the instructions which enable access to the buffer in circular fashion, where the instructions include at least one first instruction and a modular subtraction instruction. At least one first instruction causes the execution unit to load at least one register with an address index to enable addressing of elements of the buffer, an offset index to enable addressing of a last element in the buffer, and a decrement value indicative of the size of the elements in the buffer. The modular subtraction instruction causes the execution unit to determine whether the address index is zero, to load a register with the offset index if the address index is zero, and to reduce the address index by the decrement value if the address index is not zero.

In various configurations, the address index, the decrement value and the offset index may be stored in a single register or multiple registers. In one embodiment, one or more of the registers are selected from the general purpose registers (GPRs) of the microprocessor. In another embodiment, a first register stores the address index and a second register stores the offset index and the decrement value. In this case, the modular subtraction instruction causes the execution unit to determine whether the first register holds a zero value, to load the first register with the offset index if the first register holds a zero value, and to subtract the decrement value from the first register if it does not hold a zero value. Alternatively, the modular subtraction instruction causes the execution unit to determine whether the first register holds a zero value, to load a third register with the offset index if the first register holds a zero value, and to subtract the decrement value from the first register and store the result into the third register if the first register does not hold a zero value.

In another embodiment, the modular subtraction instruction includes at least one field identifying the registers used while executing the instruction. In a more specific embodiment, the modular subtraction instruction includes a first field identifying a source register for storing the address index, a second field identifying a target register for storing the offset index and the decrement value, and a third field identifying a destination register for storing a result of the modular subtraction instruction.

The execution unit of the microprocessor may further employ a base pointer to locate the buffer in the memory. In one aspect, the execution unit adds the address index to the base pointer to address the elements of the buffer.

A modular subtraction instruction for execution on a microprocessor having at least one general purpose register according to an embodiment of the present invention includes opcode bits for designating the modular subtraction instruction, and operand bits for designating at least one general purpose register storing an offset index, a decrement value, and an address index. When the modular subtraction instruction is executed on the microprocessor, the address index is modified by the decrement value if the address index is not zero and is modified by the offset index if the address index is zero.

In one aspect of the modular subtraction instruction, the opcode bits include a first opcode field denoting an extended instruction set, a function field specifying a subclass of instructions, and a second opcode field specifying the modular subtraction instruction. In another aspect, the operand bits include a first field identifying a source register for storing the address index, a second field identifying a target register storing the offset index and the decrement value, and a third field identifying a destination register. In a first embodiment, when the modular subtraction instruction is executed on the microprocessor, the source register is decremented by the decrement value and the result is stored in the destination register if the source register is not zero, or the offset index is stored in the destination register if the source register is zero. The first and third fields may identify the same register as the source and destination registers.

A method of enabling access to a buffer in memory of a processing system in circular fashion with a single instruction includes loading a roll-around index, an address index and a decrement value into at least one register and executing a buffer instruction. Executing the buffer instruction further includes determining whether the address index is zero, modifying the address index by the decrement value if the address index is not zero, and updating the address index with the roll-around index if the address index is zero.

The method may include loading the roll-around index and the decrement value into a first register, and initializing a second register with an initial address index. The initializing may include clearing the second register or loading the second register with the roll-around index. The method may include any one or more of determining whether a register holds a zero value, subtracting the decrement value from the contents of the register, and loading the roll-around index value into the register. The method may include comparing the address index to zero.

Other features and advantages of the present invention will become apparent upon study of the remaining portions of the specification and drawings.

BRIEF DESCRIPTION OF THE DRAWINGS

FIGS. 6A and 6B are flowchart diagrams illustrating a process of initiating and executing the MODSUB instruction of FIG. 1 including operation performed by the microprocessor according to an exemplary embodiment of the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need to enable implementation of circular buffers in program memory of a microprocessor system that allows maximum flexibility with minimal constraints. They have therefore developed a single microprocessor instruction that enables an implementation of a virtual circular buffer anywhere in memory using general purpose registers without the conventional constraints on the number of buffers or the size of each buffer, as will be further described below with respect to FIGS. 1-9C.

Figure 1:
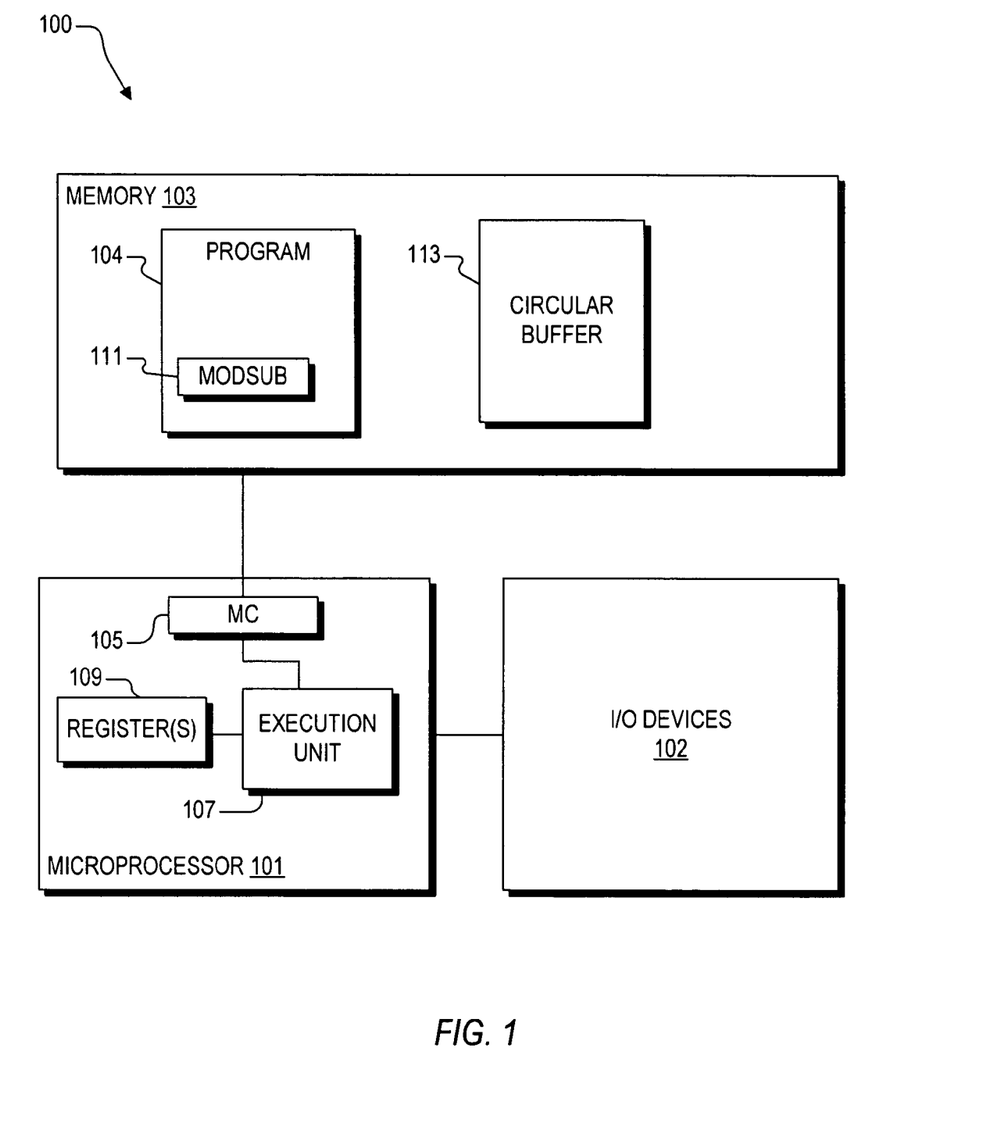
FIG. 1 is a simplified block diagram of a microprocessor system implemented according to an exemplary embodiment of the present invention including a microprocessor configured to implement and access elements of a virtual circular buffer with a single instruction.

FIG. 1 is a simplified block diagram of a microprocessor system 100 including a microprocessor 101 implemented according to an exemplary embodiment of the present invention. The microprocessor 101 is configured to implement and access elements of a virtual circular buffer 113 with a single instruction 111, which is referred to herein as the modular subtraction (MODSUB) instruction 111. Although referred to herein as a "circular" buffer 113, any type of buffer in memory is contemplated in which the MODSUB instruction 111 enables access to the buffer in circular fashion by virtue of the operation of the instruction as described herein. The microprocessor 101 is coupled to one or more input/output (I/O) devices 102 and to a memory 103, which stores the circular buffer 113 and a program 104 containing one or more instructions including the MODSUB instruction 111. The microprocessor 101 includes a memory controller (MC) 105 for interfacing the memory 103 and at least one execution unit 107 for performing functions and computations indicated by the program instructions. The microprocessor 101 includes one or more registers 109 for storing and manipulating data values and variables as controlled by instructions. Any type of register is contemplated, such as including one or more general purpose registers (GPRs) or the like.

In one embodiment, the microprocessor 101 conforms substantially to a microprocessor architecture from MIPS Technologies, Inc., such as according to either of the MIPS32® or MIPS64® architectures, in which the selected architecture may further be extended by a Digital Signal Processor (DSP) Application-Specific Extension (ASE). In one embodiment, the DSP ASE is an extension of the basic MIPS®™ microprocessor core and is integrated therewith and thus incorporated on the same core integrated circuit (IC) or chip at core synthesis. The DSP ASE extension to the core enables the same core to perform extended DSP functions rather than requiring a separate coprocessor. In the illustrated embodiment, the MODSUB instruction 111 is a DSP ASE instruction synthesized into the same core of the microprocessor 101 and included within the core instruction set. It is appreciated, however, that the present invention is not limited to MIPS® microprocessor architectures or extensions, and may be used by other processors or processing logic and the like, in which it is desired to implement one or more circular buffers. The MODSUB instruction 111 may be implemented as part of the core instruction set, or may be implemented separately as part of a coprocessor. All such configurations are possible and contemplated without falling outside the scope of the present invention.

The microprocessor system 100 may be implemented as a computer system, including but not limited to a personal computer, workstation computer, server computer, notebook computer, personal digital assistant, file server, print server, enterprise server, and the like. The microprocessor system 100 may also include an embedded system, including but not limited to a set-top box, intelligent peripheral device, automobile embedded system, embedded system in an appliance, mass storage controller, and the like.

The I/O devices 102 include devices and components for receiving data as input for provision to the microprocessor 101 for processing, including but not limited to user input. The I/O devices 102 also comprise devices for receiving from the microprocessor 101 results of the processing and for outputting the results, including but not limited to user output. The I/O devices 102 may include, but are not limited to direct memory access controllers, timers, clocks, interrupt controllers, serial port controllers, parallel port controllers, USB port controllers, IEEE 1394 controllers, SCSI controllers, Fibre Channel controllers, floppy disk controllers, hard disk controllers, graphics controllers, display devices, keyboards, mice, scanners, plotters, printers, floppy disk drives, hard disk drives, optical storage devices, tape drives, digital cameras, and the like, or any combination thereof.

The memory 103 includes any suitable storage medium memory for storing program instructions and data to be processed by the microprocessor 101, including but not limited to, dynamic random access memory (DRAM), static random access memory (SRAM), synchronous DRAM (SDRAM), double-data rate SDRAM (DDR-SDRAM), Rambus DRAM (RDRAM), read-only memory (ROM), programmable read only memory (PROM), erasable PROM (EPROM), electrically erasable PROM (EEPROM), FLASH memory, and the like, or any combination thereof. As illustrated, the memory 103 stores the virtual circular buffer 113 and the program 104 which includes the MODSUB instruction 111.

The MC 105 may include any combination of a memory-management unit (MMU) (not shown), a translation lookaside buffer (TLB) (not shown), a fixed mapping translation (FMT) (not shown), etc., as known to those skilled in the art.

The MODSUB instruction 111 is fetched by the MC 105 of the microprocessor 101 and forwarded for execution by the execution unit 107 to generate and use the circular buffer 113 as further described below.

The execution unit 107 may include any combination of an arithmetic/logic unit (ALU) (not shown), a multiply/divide unit (MDU) (not shown) and similar type functional units as known to those skilled in the art. In one embodiment, the MODSUB instruction 111 is forwarded to and executed by an ALU within the execution unit 107.

Figure 2A:
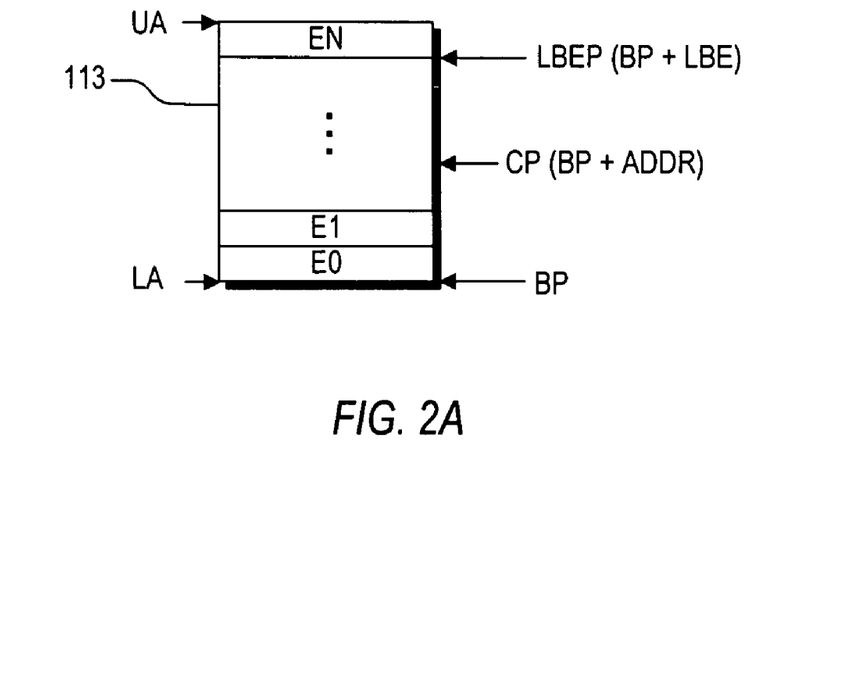
FIGS. 2A and 2B are more detailed block diagrams exemplary embodiments of the circular buffer of FIG. 1.

FIG. 2A is a more detailed block diagram of an exemplary embodiment of the circular buffer 113. As illustrated, the circular buffer 113 is located between a lower address (LA) and an upper address (UA). A bottom pointer (BP) is set equal to LA and an address (ADDR) index is added to BP, such as by the execution unit 107, to generate a current pointer (CP). The CP is used to address the buffer elements in the circular buffer 113 in order to store (write) data into or retrieve (read) data from the circular buffer 113. As shown, there is a number "N" of elements in the circular buffer 113, numbered from a first element E0, pointed to by BP, to a top element EN. Each element E0-EN in the circular buffer 113 has an equal size, and the last or top element EN is addressed when CP is set equal to a last-buffer-element pointer (LBEP), which is equivalent to BP plus a last-buffer-element (LBE) index. The LBE index is a last element offset or a roll-around index or a wrap-around index such that CP effectively loops in circular buffer 113 by decrementing ADDR to zero and then back to LBE.

Figure 2B:
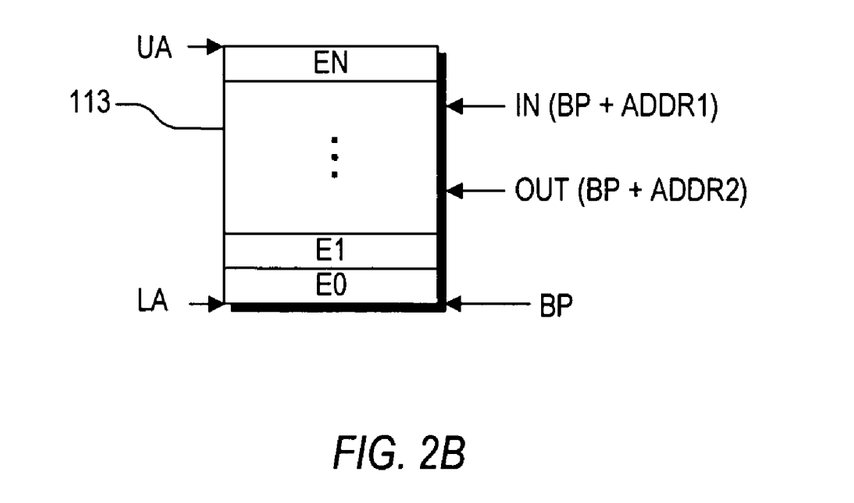

FIG. 2B is a more detailed block diagram of another exemplary embodiment of the circular buffer 113 with two different addresses or pointers IN and OUT. In this case, rather than a single ADDR value for a single element pointer CP, a first address value ADDR1 is used to define an input pointer IN and a second address value ADDR2 is used to define an output pointer OUT. The use of an input pointer and an output pointer is common for circular buffers, such as when implementing a first-in, first-out (FIFO) queue in which elements are written into the buffer using the IN pointer and retrieved from the buffer using the OUT pointer. For particular embodiments employing registers identified by the MODSUB instruction 111, as further described below, the multiple pointer embodiments are achieved using a first register to store ADDR1 for the IN pointer and a second register to store ADDR2 for the OUT pointer. The MODSUB instruction 111 is programmed to provide the appropriate register depending upon the operation being performed and the buffer element being accessed.

Figure 3:
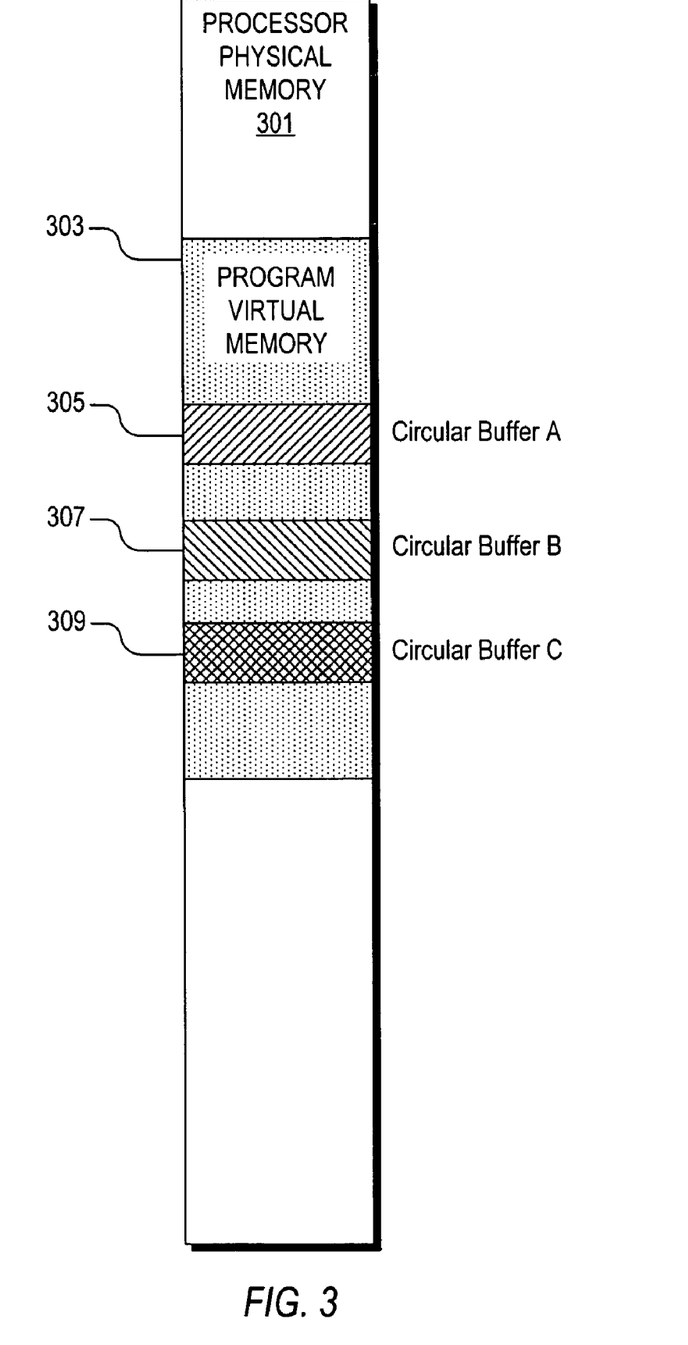
FIG. 3 is a simplified block diagram illustrating multiple circular buffers implemented in virtual memory of the program which is mapped to the physical memory of the microprocessor of FIG. 1.

FIG. 3 is a simplified block diagram illustrating multiple circular buffers implemented in virtual memory of the program which is mapped to the physical memory of the microprocessor 101. The microprocessor 101 is capable of physically specifying a range of addresses, shown as processor physical memory 301. The program code being executed by the microprocessor 101, such as, for example, from the program 104, is mapped within the processor physical memory 301 in a space, shown using a dotted area, referred to as program virtual memory 303. This mapping can be achieved using a standard address translation mechanism, such as the TLB or using predetermined fixed mapping via an MMU. Three "virtual" circular buffers 305 (Circular Buffer A, shown in a space with lines slanting to the right), 307 (Circular Buffer B, shown in a space with lines slanting to the left) and 309 (Circular Buffer C, shown in a space with cross-hatched lines) are shown located within the program virtual memory 303, each implemented and configured in a similar manner as the circular buffer 113.

As understood by those skilled in the art, the memory 103, implemented using physical devices, typically defines a significantly smaller addressable space than the processor physical memory 301 or even the program virtual memory 303. The memory 103 includes consecutive addressable locations mapped into the processor physical memory 301 of the microprocessor 101. The MC 105 performs the mapping and address translation functions between the microprocessor 101 and the memory 103 to enable proper execution of programs, such as the program 104, and generation of virtual circular buffers, such as the virtual circular buffers 305, 307 and 309 within the program memory. Such mapping and address translation schemes are known and are not discussed further herein. Also, although only three circular buffers are illustrated, any number of circular buffers may be defined and the number of circular buffers simultaneously used is limited only by the number of registers employed.

Figure 4:
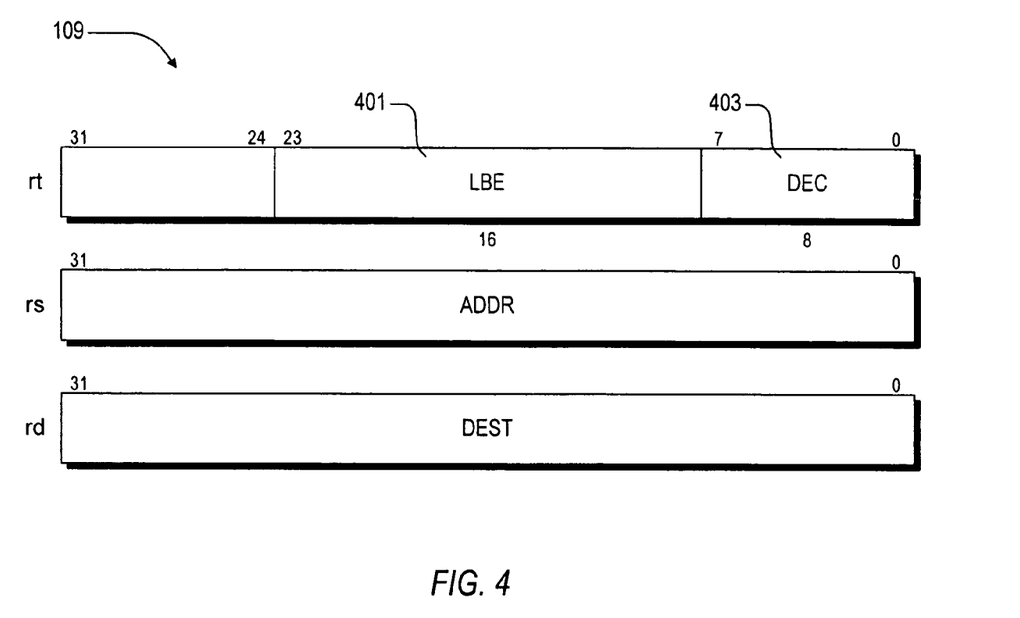
FIG. 4 is a block diagram of an exemplary configuration of the registers for use with the MODSUB instruction of FIG. 1.

FIG. 4 is a block diagram of an exemplary configuration of the registers 109 used with the MODSUB instruction 111. In the illustrated embodiment, a target register "rt" stores the LBE index in a first field 401 and a decrement (DEC) value in a second field 403. The DEC value is equivalent to the size of each element in the circular buffer 113. A source register "rs" stores the ADDR index and a destination register "rd" stores a destination (DEST) value. The particular sizes of the registers, the register fields, the indexes and the values are a matter of design choice considerations that are determined appropriate for the particular configuration (or microprocessor core) being implemented. In the illustrated embodiment, the registers rt, rs and rd are each 32-bit general purpose registers with bit zero "0" at the right-most position and bit 31 at the left-most position. The field 403 storing the DEC value is an 8-bit field including bits 0 to 7 (or 7:0) of the rt register, referred to as rt[7:0]. The field 401 storing the LBE index is a 16-bit field including bits 8 to 23 of the rt register, or rt[23:8]. The remaining or upper portion of the rt register (bits rt[31:24]) is not used or otherwise ignored.

The ADDR index is up to a 32-bit value stored within the rs register, or rs[31:0]. The DEST value is up to a 32-bit value stored within the rd register, or rd[31:0]. In the embodiments illustrated, the ADDR index and the DEST value are limited to 16-bits for practical purposes, although larger values are contemplated. The particular sizes and locations of the indexes and values may be modified depending upon the specific implementation. For example, the relative sizes may be the same or doubled for a 64-bit configuration. Also, the LBE index and DEC value could be stored in two different registers rather than in different fields of the same register. Further, depending upon relative sizes of LBE, DEC, ADDR and the registers, a single register storing all three values is contemplated. It is noted, however, that it may be desirable to define multiple ADDR indexes for the same circular buffer, so that it may be preferable to employ one register for each ADDR index.

Figure 5:
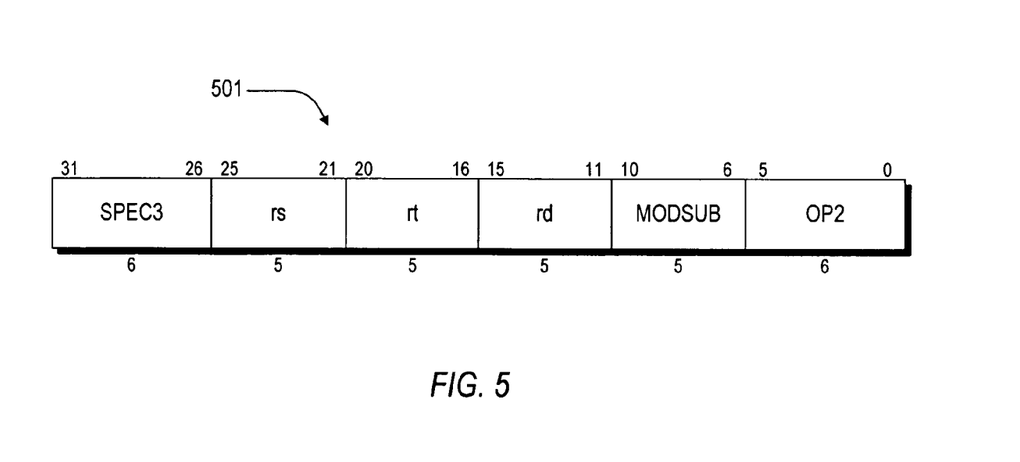
FIG. 5 is a block diagram illustrating an exemplary instruction encoding of the MODSUB instruction of FIG. 1 for the MIPS32® or MIPS64® architectures including the MIPS® DSP ASE.

FIG. 5 is a block diagram illustrating an exemplary instruction encoding 501 of the MODSUB instruction 111 for the MIPS32® or MIPS64® architectures including the MIPS® DSP ASE. The present invention is not limited to the particular architecture illustrated or its instruction encoding, format or specific operation; similar or comparable instruction encoding, formats and operations are envisioned for different microprocessor architectures. In the illustrated instruction encoding 501, the left-most 6 bits 31:26 define an opcode field containing a special SPEC3 major opcode that allows further sub-decoding by extending the opcode mapping. The extended instruction set for the DSP ASE are decoded according to predetermined opcode mapping. When the SPEC3 opcode is specified, the execution unit 107 decodes the last 6 bits 5:0 defining a function field specifying a subclass of instructions denoted herein as OP2. Although the function field may specify a DSP ASE instruction, the OP2 opcode specifies another subset of instructions defined in an operation (op) field located at bit locations 10:6, specifying the MODSUB instruction 111, which completes the opcode encoding.

The 5 bits 25:21 define a source register field identifying one of the registers 109 as the source register rs. In this case, 5 bits are used to identify one of a total 32 GPRs as the rs register. The next 5 bits 20:16 define a target register field identifying one of the registers 109 as the target register rt. The next 5 bits 15:11 define a destination register field identifying one of the registers 109 as the destination register rd. As further described below, the source and destination register fields may define the same register as both the source and destination.

As previously described, a pointer BP is set equal to the lower address LA of the circular buffer 113. The size of the circular buffer 113, or SIZE, when added to BP, would address the upper address UA at the top of the circular buffer 113. The DEC value essentially defines the size of each buffer element. The LBE index is an offset address that is added to BP to form the pointer LBEP which points to the top element (or last data value) in the circular buffer 113, such as element EN shown in FIG. 2A. Thus, the user (or program) determines the size of the buffer, or SIZE, determines the buffer element size, or DEC, and calculates LBE as LBE=SIZE−DEC. The ADDR index is added to the base address BP by the microprocessor 101 to obtain a corresponding pointer, such as the current pointer CP or an input pointer IN or an output pointer OUT, etc., where each pointer enables access to a corresponding element in the circular buffer 113. The ADDR index is decremented by DEC to point to the next data value and then the result is added to BP by the execution unit 107 to obtain the absolute virtual address of that buffer element. When ADDR is decremented to zero, it is rolled or wrapped back to the LBE index to enable access to the last buffer element EN at the top of the circular buffer 113.

An exemplary instruction format of the MODSUB instruction 111 employing the instruction encoding 501 and the exemplary configuration of the registers 109 is as follows:

MODSUB rd, rs, rt

The corresponding operation description using the above instruction format of the MODSUB instruction 111 is as follows:

---
LBE = (rt >> 8) & 0xffff;
DEC = rt & 0xff;
rd = (rs == 0) ? LBE : rs − DEC;
---

The illustrated instruction format includes 3 operation lines performed by the execution unit 107 of the microprocessor 101 when executing the MODSUB instruction 111. In the first operation line, the LBE index is retrieved from the field 401 of the rt register. Note that the value in the rt register is shown as being retrieved, right-shifted 8 bits (denoted by ">>"), and bitwise ANDed (denoted by "&") with the 16-bit HEX value "ffff" (preceded with hexadecimal notation "0x"). In the second operation line, the DEC value is retrieved from the field 403 of the rt register and bitwise ANDed with the 8-bit HEX value "ff". The third operation line illustrates the MODSUB instruction operation using the retrieved operands.

Substituting the defined variables, the last line of the operation description may be re-written as follows:

---
DEST ← (ADDR = = 0) ? LBE : ADDR − DEC
--- where the DEST value is provided in the rd register, the ADDR index is provided in the rs register, and the LBE index and the DEC value are specified in the rt register. The illustrated operation description shows a modular subtraction performed on the ADDR index using the specified DEC value and the LBE index as the modular roll-around value. In particular, the ADDR value (or register rs) is checked for a zero. If ADDR is zero, then it has reached the bottom of the circular buffer 113 and it is rolled back to point to the top element in the buffer by resetting it to LBE. To reset ADDR with LBE using the destination register rd, the 16 bits in the rt register, or rt[23:8], are loaded into the right-most bits of the rd register, or rd[15:0], and the higher bits of the rd register, or rd[31:16] are set to all zeros. If the ADDR value is not zero, then the ADDR value is decremented by DEC, or ADDR−DEC, and stored in the rd register as the DEST value. If the rd register is defined as the same register rs, then the rs register is updated with the new ADDR value in either case.

The source and destination registers may be defined as the same register or different registers. If a separate destination register rd is defined, then, after execution of the MODSUB instruction 111, the contents of the rd register may be copied into the rs register to update the rs register to point to the next element in the circular buffer 113. Thus, the ADDR index is either decremented by the DEC value or updated with the LBE index and the result placed in the rd register leaving the rs register unmodified. A separate rd register may be defined to keep the rs register temporarily unmodified if for any reason it is desired to conveniently address the prior buffer element again using the rs register while addressing the next element using the rd register. Alternatively, the destination register field in the MODSUB instruction 111 may be made the same as the source register field, so that the source register is the same as the destination register (e.g., rd=rs). If the source and destination registers are the same, then the result of execution of the MODSUB instruction 111 is stored back into the rs register. Using a single register for the source and destination reduces the number of registers used thereby increasing resource utilization.

In exemplary embodiments employing the MIPS® architecture, the MODSUB instruction 111 assumes that the DEC value is a multiple of the buffer size and that the value zero (0) is eventually reached when the MODSUB instruction 111 is called repeatedly. If this is not the case, then the MODSUB instruction 111 will not do a modular wrap-around to the last element in the buffer, which would potentially cause memory corruption and a memory fault in the application using the MODSUB instruction 111. If an index load word instruction used in conjunction with the MODSUB instruction 111 uses an index value that is not a multiple of the buffer element, then an address error exception occurs. An address error exception also occurs if a negative index pointer generates an invalid address value. A safe programming practice would be to check for a negative index value after the call to the MODSUB instruction 111 during code development (in a #ifdef ERROR_CHECK, for example), and to optionally not compile this error checking code in the final production code. The typical size of the data operand is either 2 bytes or 4 bytes, which is also the specified DEC value. It is noted that the buffer start value, or the BP pointer, need only be aligned to the natural width of the data element in the circular buffer 113.

Figures 6A, 6B:
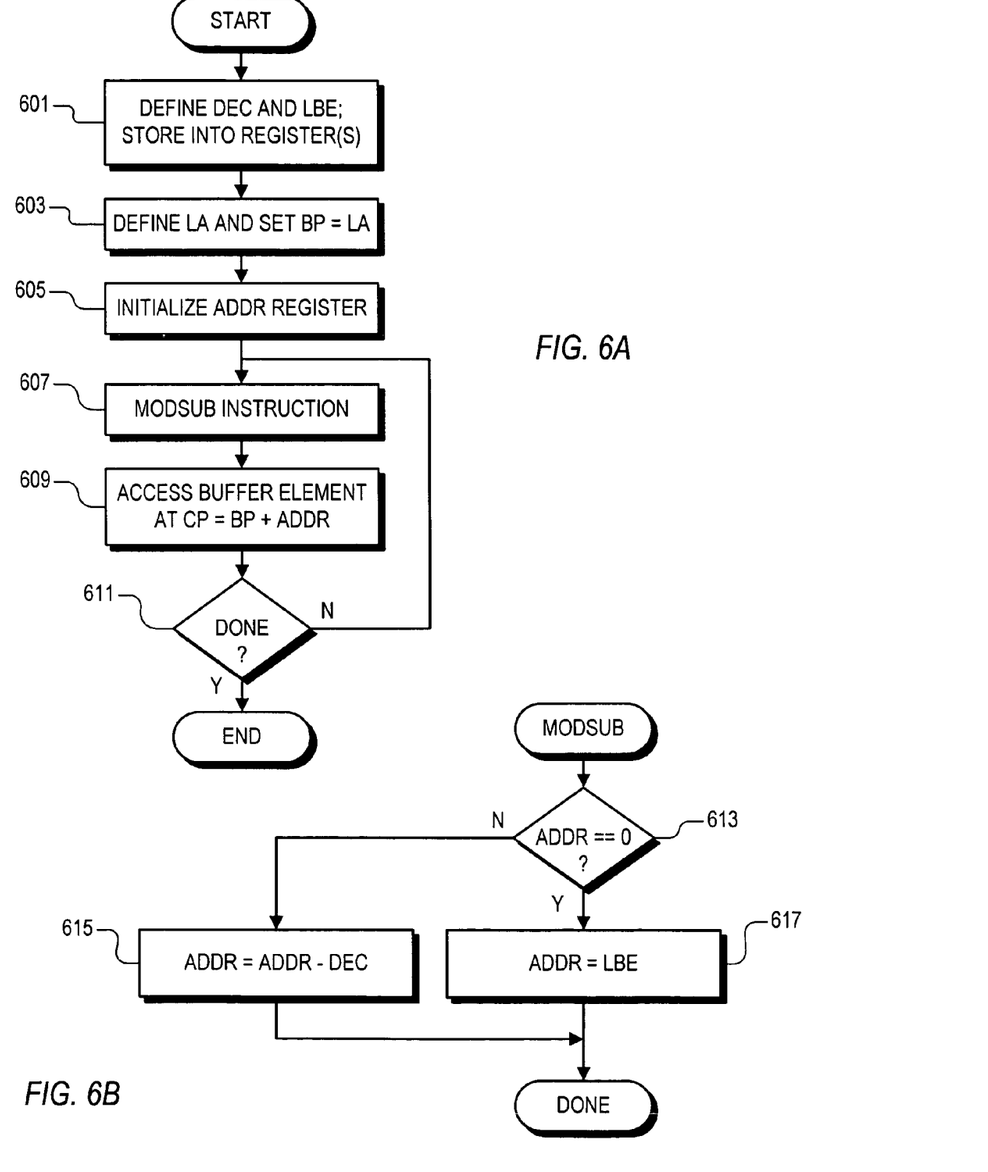
FIG. 6A is a flowchart diagram illustrating high-level user and program functions using the MODSUB instruction.
FIG. 6B is a flowchart diagram illustrating the internal processor functionality during each execution of the MODSUB instruction of FIG. 6A.

FIGS. 6A and 6B are flowchart diagrams illustrating a process of initiating and executing the MODSUB instruction 111 including operation performed by the microprocessor 101 according to an exemplary embodiment of the present invention. One or more of the blocks may be re-ordered without modifying the basic modular subtract function. FIG. 6A is a flowchart diagram illustrating high-level user and program functions using the MODSUB instruction. At first block 601, the LBE index and DEC value are defined and stored into one or more registers. The size of the circular buffer, or SIZE, need not be explicitly defined since implicitly defined by the LBE index and the DEC value. The number of registers used depends upon the relative size of the registers and the LBE index and DEC values as previously described. At next block 603, the location of the lower address LA of the circular buffer 113 is determined and BP is set equal to LA to point to the beginning of the circular buffer 113. At next block 605, the register holding the ADDR index is initialized, such as being reset or otherwise defined with an initial value. In various embodiments, the rs register is cleared (all 0's) or loaded with the LBE index, or preset, if desired, to point to any element within the circular buffer 113. Also, if multiple ADDR indexes are desired for a given circular buffer, each index or its corresponding buffer is initialized.

At next block 607, the MODSUB instruction 111 is executed. It is appreciated by those skilled in the art that the MODSUB instruction 111 is typically executed in one or more loops and thus repeatedly called to access (store and/or retrieve) successive elements in the circular buffer 113. As shown, for example, after execution of the MODSUB instruction at block 607, operation proceeds to block 609 in which the buffer element is accessed using a pointer CP=BP+ADDR (or any defined alternative pointer, such as IN or OUT as previously described). Operation then proceeds to block 611 in which it is queried whether operation using the circular buffer 113 has been completed. If not, operation loops back to block 607. Additional computation functions and instructions (not shown) are provided in the loop depending upon the use and function of the circular buffer 113 as appreciated by those of ordinary skill in the art.

FIG. 6B is a flowchart diagram illustrating the internal processor functionality during each execution of the MODSUB instruction at block 607 of FIG. 6A. At block 613, the microprocessor 101 determines whether ADDR is zero, and then modifies ADDR as shown in either block 615 or block 617. In particular, if ADDR is not zero, operation proceeds to block 615 in which the microprocessor 101 decrements ADDR by DEC, such as performed by a subtraction operation. An addition operation is contemplated in an alternative embodiment (e.g., increment). If ADDR is zero as determined at block 613, then operation proceeds instead to block 617 in which the microprocessor 101 sets ADDR equal to LBE (or otherwise replaces ADDR with LBE). The MODSUB instruction 111 is complete after ADDR is updated at block 615 or block 617, and operation "returns" or otherwise proceeds to block 609.

Since the width of the field 401 of the rt register is 16 bits in the illustrated configuration, the maximum size of the circular buffer 113 defined by the LBE index is 64 KB. It is appreciated, however, that any number of bits may be employed to define the buffer size, so that any practicable size may be defined. The size of the circular buffer 113 is not restricted to be a power of two (2), although for proper operation for most configurations is divisible by two. As an example, the MODSUB instruction 111 may be used to create a circular buffer with 5K half-word (2 byte) elements for a buffer size of 10 KB. In conventional configurations, if a minimum of 10 KB are needed, then a buffer size of 16 KB would be required resulting in a waste of memory and microprocessor resources. In this particular example employing the illustrated embodiment of the present invention, SIZE is 10 KB, DEC is 2 and LBE is set to 10 KB–2. The circular buffer 113 may be located anywhere in memory 103 as long as the starting address is aligned to the natural width of the data elements in the buffer (e.g., where the data width in bytes is 1, 2, 4, 8, etc.).

In conventional configurations, special registers are typically defined so that the total number of circular buffers that can be implemented is limited or otherwise predetermined. A circular buffer instruction implemented according to an embodiment of the present invention does not require special registers so that GPRs may be used to implement each circular buffer. The total number of circular buffers defined is theoretically unlimited using the MODSUB instruction 111, and the number of circular buffers used simultaneously is limited only by the total number of registers defined for the particular microprocessor.

Figure 7:
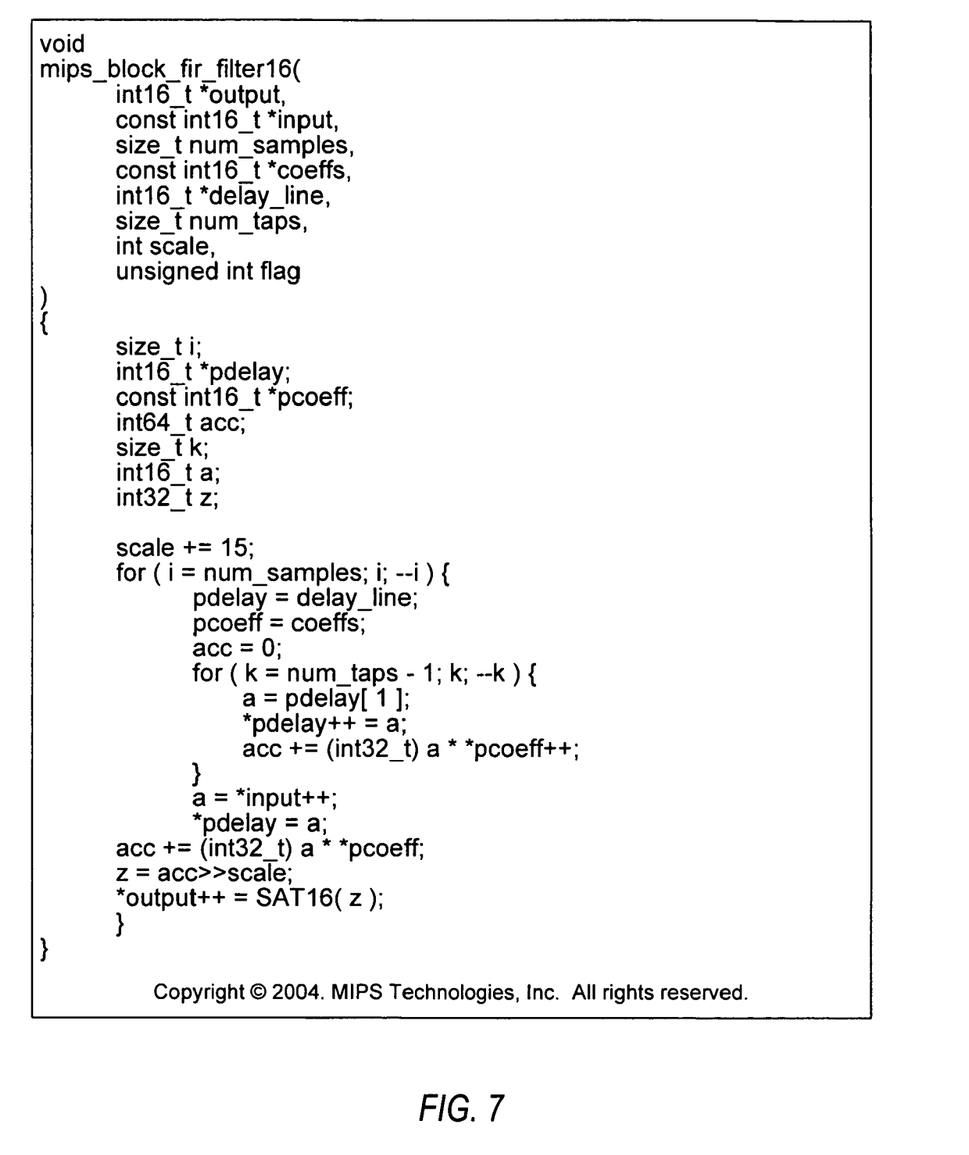
FIG. 7 shows an exemplary 40-tap block FIR filter written in the C programming language without the MODSUB instruction.

FIG. 7 shows an exemplary 40-tap block FIR filter written in the C programming language without the MODSUB instruction. This program was compiled with compiler optimization using the MIPS32® instruction set and the resulting code required 620 cycles per element (cycles/element).

Figure 8:
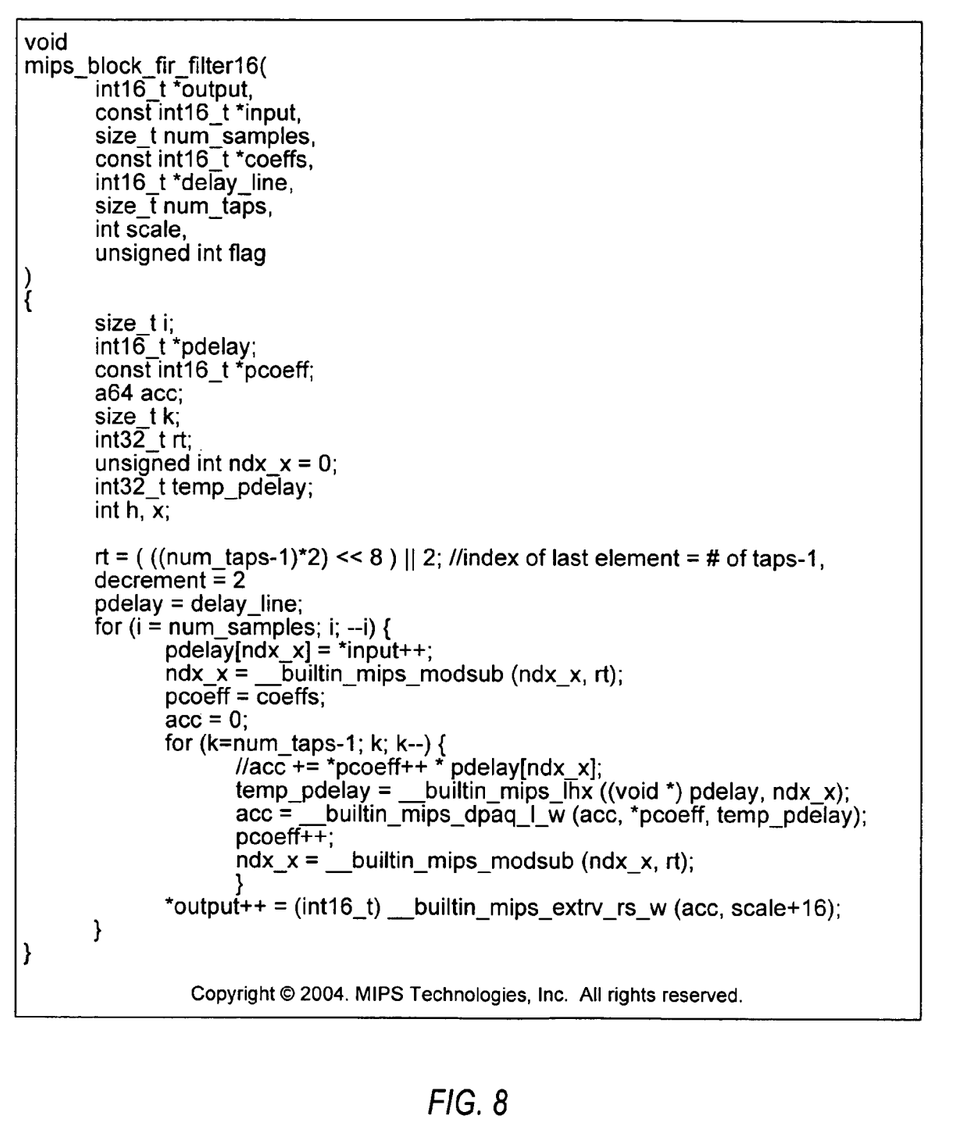
FIG. 8 shows an exemplary version of the same 40-tap block FIR filter written in the C programming language and optimized with the MODSUB instruction.

For purposes of disclosure, FIG. 8 shows an exemplary version of the same 40-tap block FIR filter written in the C programming language and optimized with the MODSUB instruction.

Figure 9A:
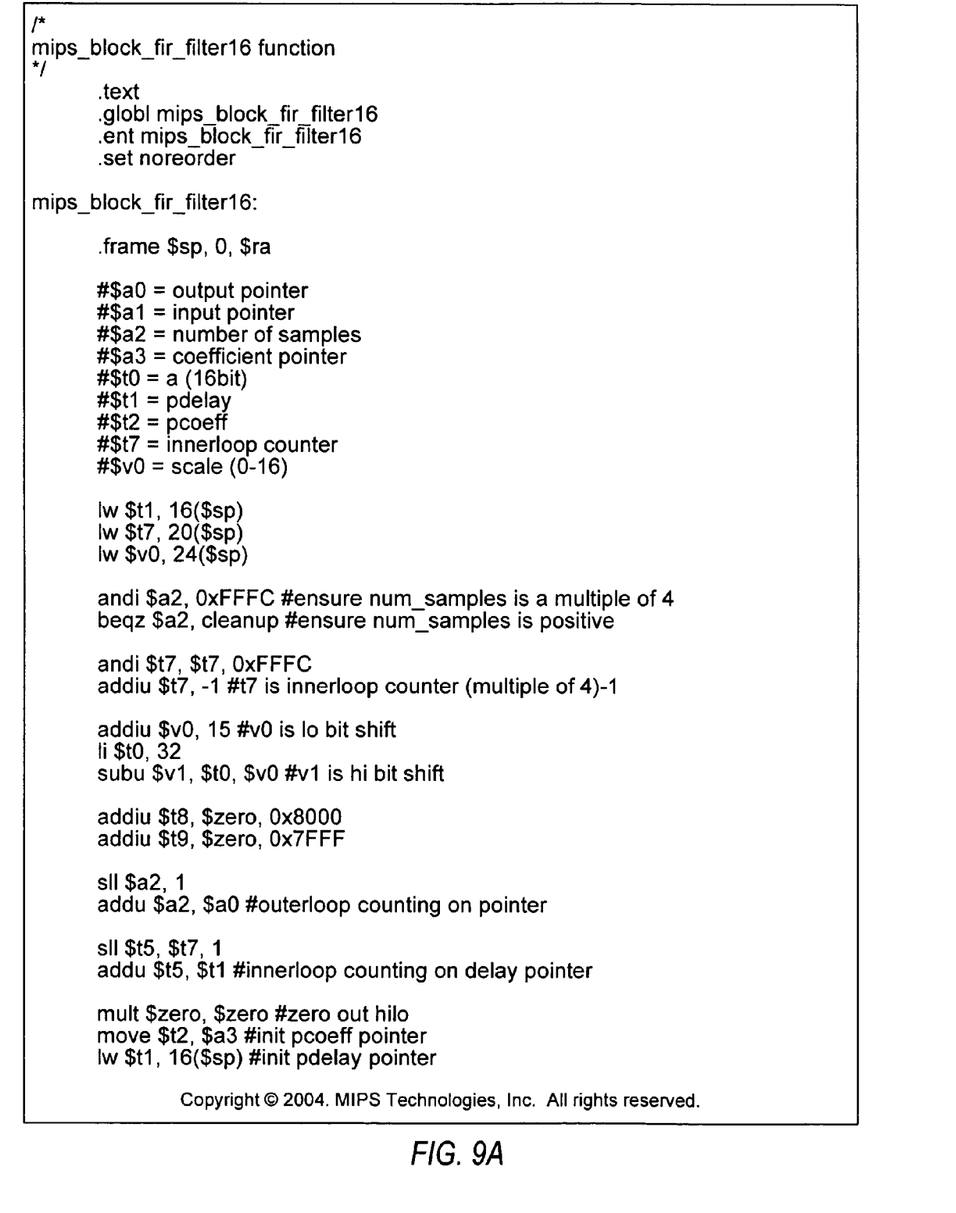
FIGS. 9A, 9B and 9C collectively show the same 40-tap block FIR filter written using assembly code for the MIPS32® architecture and hand-tuned to achieve optimal performance for the MIPS32® 24K® microprocessor architecture and without using the MODSUB instruction.
Figure 9B:
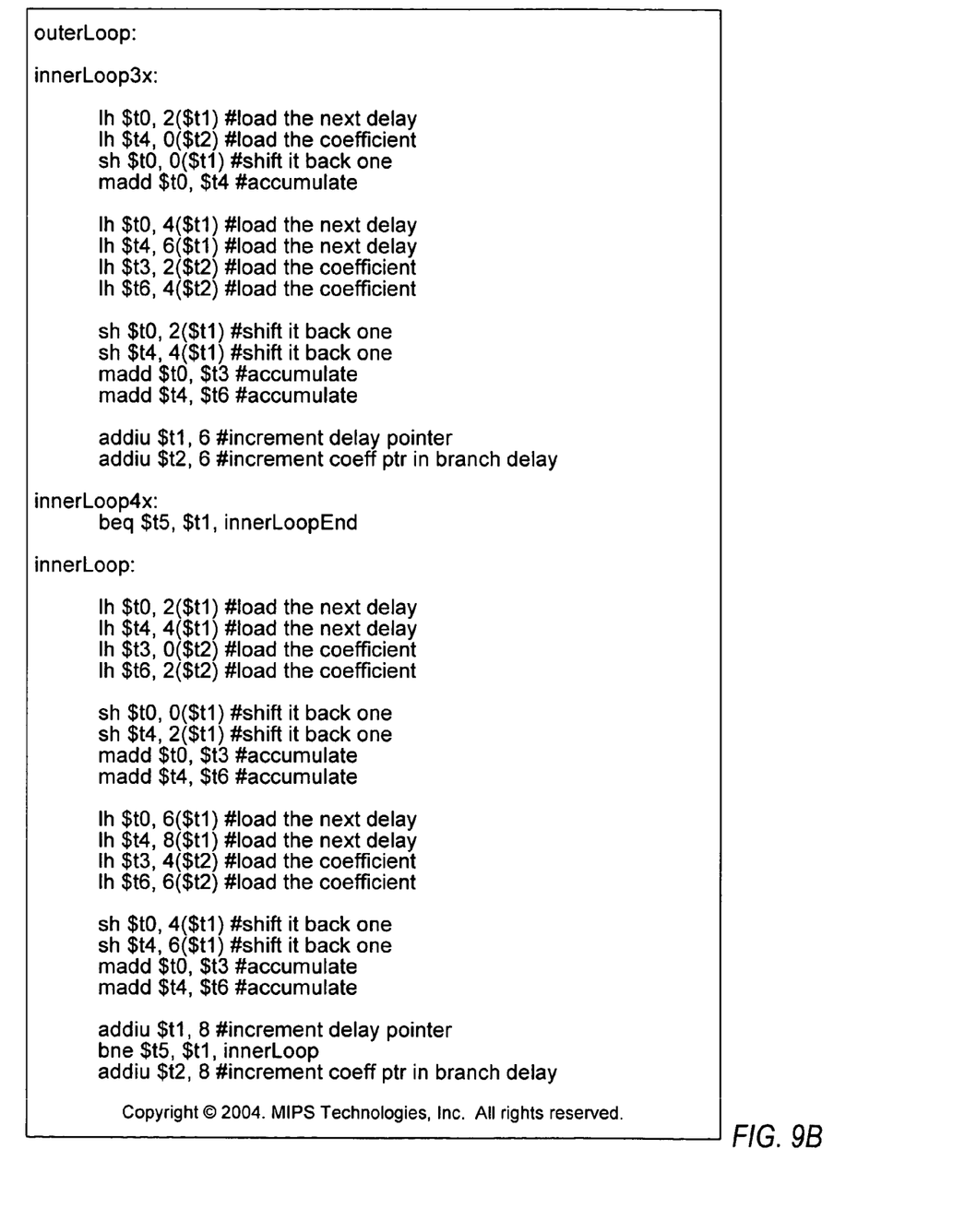
Figure 9C:
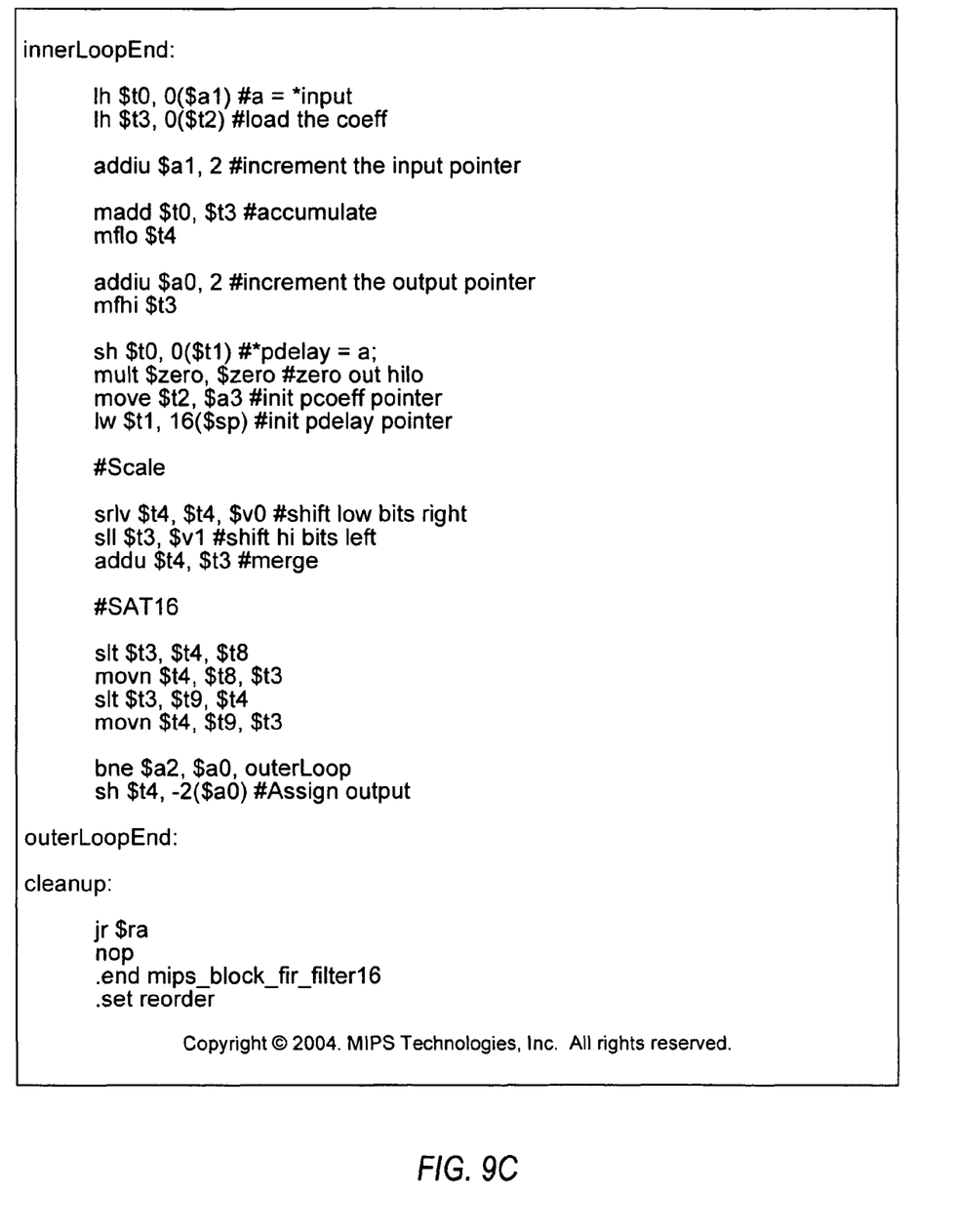

FIGS. 9A, 9B and 9C collectively show the same 40-tap block FIR filter written using assembly code for the MIPS32® architecture and hand-tuned to achieve optimal performance for the MIPS32® 24K® microprocessor architecture and without using the MODSUB instruction. This version required 401 cycles/element.

Although not shown, the same 40-tap block FIR filter was written in C both with and without the MODSUB instruction. The version without the MODSUB instruction required 27 instructions in the two loops, whereas the version with the MODSUB instruction required only 22 instructions in both loops. In this manner, the source code was significantly reduced. It is appreciated that reducing or otherwise simplifying the source code reduces valuable programming time and maximizes programming resources.

The C code for both versions was compiled for the MIPS32® microprocessor employing the DSP ASE, the first without the MODSUB instruction and the second with the MODSUB instruction. The version without the MODSUB instruction required 256 cycles/element during execution, which was superior to both the C version and the hand-written assembly versions based on the MIPS32® instruction set without DSP ASE. The compiled version of the C code employing the DSP ASE with the MODSUB instruction, however, used only 214 cycles/element during execution, which provides a substantial improvement over the other versions previously described.

In a particular embodiment, the version compiled for DSP ASE with the MODSUB instruction reduced the number of cycles/element by more than 15% compared to similar code compiled for DSP ASE without the MODSUB instruction, and reduced the number of cycles/element by almost half as compared to the hand-optimized version of assembly code shown in FIGS. 9A-9C. Reducing the number of cycles per element significantly enhances performance of the microprocessor 101 when performing DSP functions. The performance increase is multiplied by the number of elements of each buffer and further multiplied by the number of buffers employed.

It is now appreciated by those skilled in the art that the MODSUB instruction simplifies and reduces the source code, and further optimizes performance by significantly reducing the number of cycles/element required to perform the same filter function as compared to conventional configurations without the MODSUB instruction. Programming resources are optimized and code performance is maximized employing a MODSUB instruction implemented according to an embodiment of the present invention.

Although the present invention has been described in considerable detail with reference to certain preferred versions thereof, other versions and variations are possible and contemplated. For example, a single register is sufficient if the total number of bits for the ADDR, DEC and LBE values are less than or equal to the register size. In the 32-bit case, the sizes of at least one of the values can be reduced to accommodate all three. In the 64-bit case, the ADDR index may be stored in the upper double-word of the same register holding LBE and DEC in the lower double-word. The sizes of each of the values may also be increased, such as, for example, doubled in the 64-bit case as compared to the 32-bit case illustrated.

As previously described, multiple ADDR values may be employed for the same circular buffer, such as an input address IN and a separate output address OUT. Additional registers are used if multiple pointers are defined for the same circular buffer. If multiple address or pointers are defined for a common circular buffer, the source register field for each MODSUB instruction is programmed with the appropriate value to access the corresponding register and address type for each call. Although only one circular buffer is described in detail, any number of circular buffers may be defined and the number simultaneously used is limited only by the total number of registers or GPRs.

The MODSUB instruction has been defined as a DSP extension to the basic set of microprocessor instructions, but could be incorporated as part of the basic instruction set if desired. Incorporation into the primary instruction set architecture (ISA) may be valuable in some configurations since the use of circular buffers is not limited to DSP functions. In the embodiment illustrated, the DSP ASE is synthesized into the same core as the primary microprocessor, but could also be implemented as a coprocessor instruction in a microprocessor system utilizing a coprocessor.

Although the present invention and its benefits, features and advantages have been described in detail, other embodiments are encompassed by the invention. In addition to implementations of the invention using hardware, the invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A processor integrated circuit configured to enable access of a virtual buffer in circular fashion, comprising:
   a first general purpose register (GPR) storing an address index and a second GPR storing both a last element offset and a decrement; and
   logic that executes a circular buffer instruction in which it compares said address index with zero, modifies said address index to said last element offset if said address index is zero, and modifies said address index by said decrement if said address index is not zero,
   wherein said circular buffer instruction identifies said first GPR and said second GPR storing said address index, said last element offset and said decrement, and
   wherein the number of bits required to store both the last element offset and the decrement is less than the number of bits available in the second GPR.

2. The processor integrated circuit of claim 1, wherein said logic subtracts said decrement from said address index when said address index is not zero.

3. The processor integrated circuit of claim 1, wherein said logic, while executing said circular buffer instruction, retrieves said last element offset and said decrement from said second GPR, determines whether said first GPR is zero, loads said first GPR with said last element offset if said first GPR is zero, and subtracts said decrement from said first GPR if said first GPR is not zero.

4. The processor integrated circuit of claim 1, wherein said logic, while executing said circular buffer instruction, retrieves said last element offset and said decrement from said second GPR, determines whether said first GPR is zero, loads a third GPR with said last element offset if said first GPR is zero, and subtracts said decrement from said first GPR and stores the result into said third GPR if said first GPR is not zero.

5. The processor integrated circuit of claim 1, further comprising a memory controller for fetching said circular buffer instruction from an external memory.

6. The processor integrated circuit of claim 1, wherein said circular buffer instruction identifies said first GPR storing said address index, said second GPR storing said last element offset and said decrement, and a third GPR providing a destination for a result of modifying said address index.

7. A microprocessor system, comprising:
   a microprocessor, comprising:
      a plurality of registers including a first register to store an address index and a second register to store both an offset index and a decrement value; and
      an execution unit, coupled to said plurality of registers, that executes program instructions; and a memory, coupled to said microprocessor, that stores a buffer and said instructions that enable access to said buffer in circular fashion, said instructions including:
at least one first instruction that causes said execution unit to load said first register with said address index to enable addressing of elements of said buffer, load said second register with said offset index to enable addressing of a last element in said buffer, and load said second register with said decrement value indicative of a size of said elements of said buffer; and
a modular subtraction instruction that causes said execution unit to determine whether said address index is zero, that loads at least one of said plurality of registers with said offset index if said address index is zero, and that reduces said address index by said decrement value if said address index is not zero,
wherein said modular subtraction instruction includes at least one field identifying said plurality of registers, and
wherein the number of bits required to store both the last element offset and the decrement is less than the number of bits available in the second GPR.

8. The microprocessor system of claim 7, wherein said modular subtraction instruction causes said execution unit to determine whether said first register holds a zero value, to load said first register with said offset index if said first register holds a zero value, and to subtract said decrement value from said first register if said first register does not hold a zero value.

9. The microprocessor system of claim 7, wherein said modular subtraction instruction causes said execution unit to determine whether said first register holds a zero value, to load another register with said offset index if said first register holds a zero value, and to subtract said decrement value from said first register and store the result into said another register if said first register does not hold a zero value.

10. The microprocessor system of claim 7, wherein said microprocessor further comprises a memory controller for fetching said at least one first instruction and said modular subtraction instruction from said memory.

11. The microprocessor system of claim 7, wherein said modular subtraction instruction includes a first field identifying a source register for storing said address index, a second field identifying a target register for storing said offset index and said decrement value, and a third field identifying a destination register for storing a result of said modular subtraction instruction.

12. The microprocessor system of claim 7, wherein said execution unit employs a base pointer to locate said buffer in said memory.

13. The microprocessor system of claim 12, wherein said execution unit adds said address index to said base pointer to address said elements of said buffer.

14. The microprocessor system of claim 7, wherein each of said plurality of registers is selected from a plurality of general purpose registers.

15. A modular subtraction instruction stored in computer-readable memory for execution on a microprocessor coupled to the computer-readable memory and having at least one general purpose register, the modular subtraction instruction comprising:
a plurality of opcode bits stored in the computer-readable memory for designating the modular subtraction instruction; and
a plurality of operand bits stored in the computer-readable memory, said plurality of operand bits including a first field identifying a source register for storing an address index, a second field identifying a target register storing an offset index and a decrement value, and a third field identifying a destination register,
wherein when the modular subtraction instruction is executed on the microprocessor, said address index is modified by said decrement value if said address index is not zero and is modified by said offset index if said address index is zero, and
wherein the number of bits required to store both the offset index and the decrement value is less than the number of bits available in the target register.

16. The modular subtraction instruction of claim 15, wherein said plurality of opcode bits includes a first opcode field denoting an extended instruction set, a function field specifying a subclass of instructions, and a second opcode field specifying the modular subtraction instruction.

17. The modular subtraction instruction of claim 15, wherein when the modular subtraction instruction is executed on the microprocessor, said source register is decremented by said decrement value and the result stored in said destination register if said source register is not zero, and said offset index is stored in said destination register if said source register is zero.

18. The modular subtraction instruction of claim 17, wherein said first and third fields identify the same register as said source and destination registers.

19. A method of enabling access to a buffer in memory of a processing system in circular fashion with a single instruction, comprising:
loading a roll-around index and a decrement value into a first register, and initializing a second register with an address index; and
executing a buffer instruction which identifies the first and the second registers, comprising:
determining whether the address index is zero;
modifying the address index by the decrement value if the address index is not zero; and
updating the address index with the roll-around index if the address index is zero,
wherein the number of bits required to store both the roll-around index and the decrement value is less than the number of bits available in the first register.

20. The method of claim 19, wherein said initializing comprises clearing the second register to a zero value.

21. The method of claim 19, wherein said initializing comprises loading the second register with the roll-around index.

22. The method of claim 19, wherein said determining whether the address index is zero comprises determining whether a register holds a zero value.

23. The method of claim 22, wherein said modifying the address index by the decrement value comprises subtracting the decrement value from the contents of the register.

24. The method of claim 22, wherein said updating the address index with the roll-around index comprises loading the roll-around index value into the register.

25. The method of claim 19, wherein said determining whether the address index is zero comprises comparing the address index to zero.

* * * * *